(12) United States Patent
Sekiya et al.

(10) Patent No.: US 8,363,199 B2
(45) Date of Patent: Jan. 29, 2013

(54) LIQUID CRYSTAL DISPLAY DEVICE

(75) Inventors: Kuninobu Sekiya, Chiba (JP); Yasuyuki Yamada, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 397 days.

(21) Appl. No.: 12/571,574

(22) Filed: Oct. 1, 2009

(65) Prior Publication Data

US 2010/0079718 A1    Apr. 1, 2010

(30) Foreign Application Priority Data

Oct. 1, 2008 (JP) .................................. 2008-255939
Oct. 10, 2008 (JP) .................................. 2008-263465

(51) Int. Cl.
*G02F 1/1333* (2006.01)
*G02F 1/1339* (2006.01)
(52) U.S. Cl. ........................ 349/153; 349/138; 349/190
(58) Field of Classification Search .................. 349/153, 349/138, 190
See application file for complete search history.

(56) References Cited

U.S. PATENT DOCUMENTS

| 6,859,254 | B2 * | 2/2005 | Kim et al. | 349/190 |
| 7,154,578 | B2 * | 12/2006 | Kim | 349/153 |
| 2006/0197902 | A1 * | 9/2006 | Cho et al. | 349/153 |
| 2007/0263159 | A1 | 11/2007 | Kobayashi et al. | |
| 2007/0291216 | A1 * | 12/2007 | Chan et al. | 349/153 |
| 2008/0137022 | A1 * | 6/2008 | Komeno et al. | 349/153 |
| 2008/0192186 | A1 * | 8/2008 | Nakagawa | 349/106 |
| 2009/0033846 | A1 * | 2/2009 | Yamada et al. | 349/110 |

FOREIGN PATENT DOCUMENTS

| JP | 2007-199341 | 8/2007 |
| JP | 2007-248743 | 9/2007 |
| JP | 2007-256415 | 10/2007 |
| JP | 2007-304273 | 11/2007 |
| JP | 2008-107488 | 5/2008 |
| JP | 2008-176237 | 7/2008 |

* cited by examiner

*Primary Examiner* — Bumsuk Won
*Assistant Examiner* — Charles Chang
(74) *Attorney, Agent, or Firm* — Antonelli, Terry, Stout & Kraus, LLP.

(57) ABSTRACT

Provided is a liquid crystal display device including: a first substrate and a second substrate which are arranged so as to be opposed to each other for sandwiching a liquid crystal; an image display portion; a sealing material which seals the liquid crystal; and a light-shielding film which is formed on a liquid crystal side of the second substrate so that a part of the light-shielding film extends beyond the image display portion to overlap with the sealing material, and which has openings in the image display portion, at least in regions of the multiple pixels, in which the part of the light-shielding film that overlaps with the sealing material has a recessed portion formed on a sealing material side of the light-shielding film continuously or discontinuously along a circumferential direction of the sealing material, to a depth that is smaller than a thickness of the light-shielding film.

13 Claims, 13 Drawing Sheets

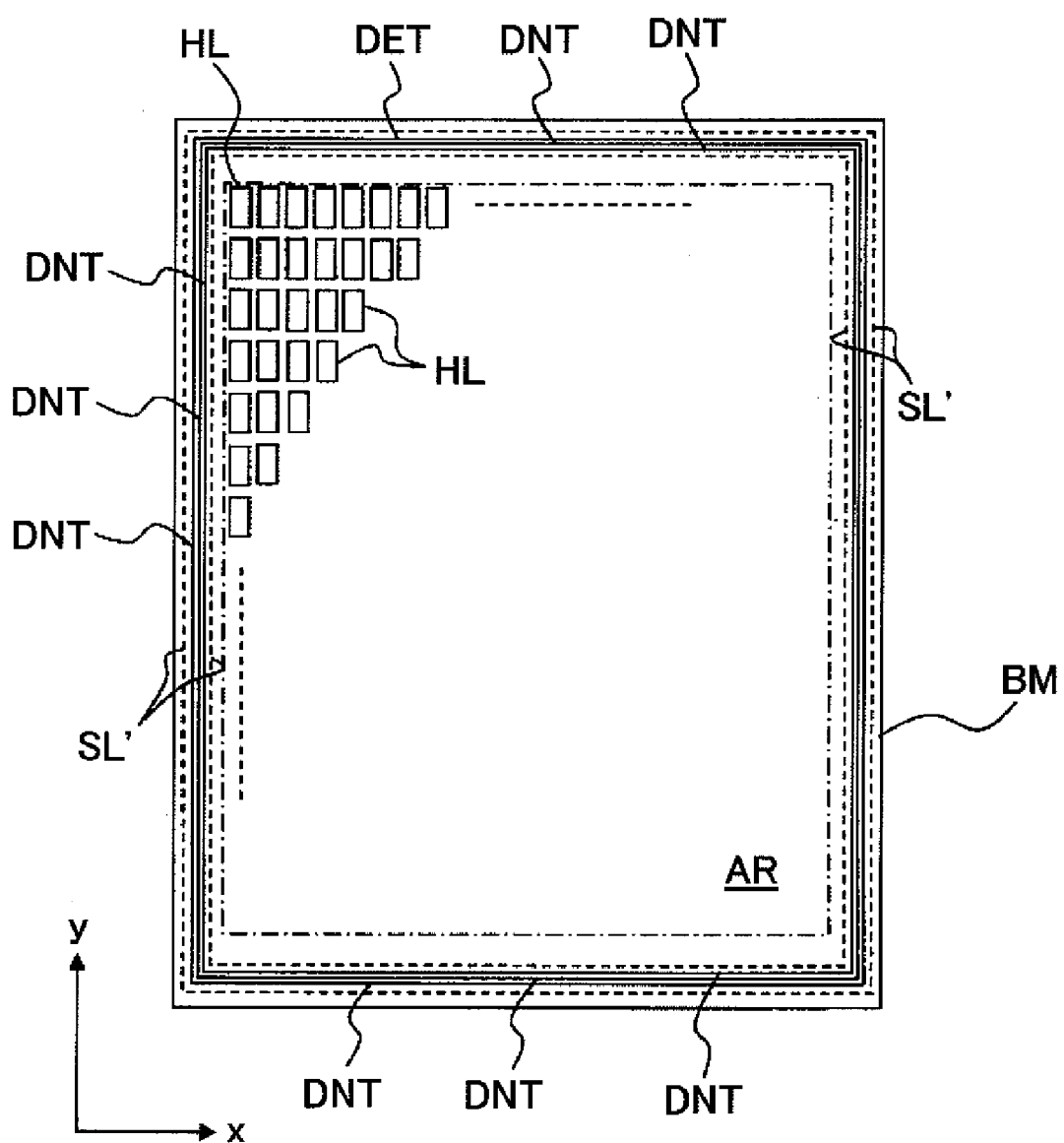

LIQUID CRYSTAL DISPLAY DEVICE

CROSS-REFERENCE TO RELATED APPLICATIONS

The present application claims priority from Japanese applications JP 2008-255939 filed on Oct. 1, 2008, and JP 2008-263465 filed on Oct. 10, 2008, the contents of which are hereby incorporated by reference into this application.

BACKGROUND OF THE INVENTION

1. Field of the Invention

The present invention relates to a liquid crystal display device, and more particularly, to a liquid crystal display device in which a pair of substrates sandwiching a liquid crystal is bonded together by a sealing material for sealing the liquid crystal.

2. Description of the Related Art

Liquid crystal display devices (liquid crystal display panels) have a structure in which a pair of substrates arranged so as to be opposed to each other for sandwiching a liquid crystal serves as an envelope, an image display portion including an aggregation of multiple pixels is located in a direction in which the liquid crystal spreads, and the liquid crystal is sealed by a sealing material provided between the pair of substrates to surround the image display portion.

In this case, enhancing the substrate-side adhesion of the sealing material improves the sealing effect of the sealing material, and a reliable liquid crystal display device is obtained as a result.

In some cases, this structure has a black matrix (herein, sometime referred to as light-shielding film in this description) formed on the liquid crystal side of one of the paired substrates. The black matrix has an opening in each pixel region in the image display portion to provide an effect of blocking light between adjacent pixels, thereby attaining an improvement of the contrast.

In this case, the black matrix is structured to extend to an outside of the image display portion until the black matrix overlaps well with a region where the sealing material is provided (hereinafter, referred to as sealing material formation region), thereby blocking light in the periphery of the image display portion. This prevents light leakage caused by, for example, light emitted from a backlight, which is provided on the rear side of the liquid crystal display panel, and transmitted through the sealing material and its vicinity.

An example of technology related to the black matrix under a sealing material is disclosed in JP 2008-176237 A, where a part of the black matrix that overlaps with the sealing material has a slit or an opening. This black matrix is coated with an overcoat film made of a resin, and is improved in adhesive strength because the substrate is brought into contact with the overcoat film in the slit or opening, which means a larger bonding area is obtained between the substrate and the overcoat film.

Other documents relevant to the present invention include JP 2008-107488 A and JP 2007-304273 A. JP 2008-107488 A discloses a black matrix with a slit in a place where the black matrix overlaps with a photo-curing sealing material. This document mentions that, in curing the sealing material after a light-shielding wiring pattern is formed on the other substrate, which is not the one where the black matrix is formed, such that the wiring pattern overlaps with the sealing material, the sealing material is irradiated with light through the slit formed in the black matrix. JP 2007-304273 A discloses a black matrix with a slit in a place where the black matrix overlaps with a photo-curing sealing material. This document does not mention a wiring pattern that is arranged to overlap with the sealing material as the one in JP 2008-107488 A, but describes the irradiation of the sealing material with enough light through the slit formed in the black matrix.

In some liquid crystal display devices, an insulating film or the like formed in the image display portion on the liquid crystal side of each of the paired substrates is, for example, in multiple layers and extends to the sealing material formation region.

JP 2007-256415 A, JP 2007-199341 A, and JP 2007-248743 A, for example, disclose structures of the insulating film or the like formed on the liquid crystal side of each substrate that are designed to improve the substrate-side adhesion of the sealing material.

Specifically, JP 2007-256415 A discloses a structure in which the insulating film or the like is a laminate of a gate insulating film and an organic insulating film which are formed in order on the substrate, and the organic insulating film has a through hole that exposes a surface of the gate insulating film in the sealing material formation region. The sealing material is thus bonded to the gate insulating film as well through the through hole formed in the organic insulating film.

In addition, JP 2007-199341 A discloses a structure in which the insulating film or the like is a resin film formed on the substrate, and the resin film has a through hole that exposes a surface of the substrate in the sealing material formation region. The sealing material is thus bonded to the substrate through the through hole formed in the resin film.

Further, JP 2007-248743 A discloses a structure in which an inorganic alignment film formed on the substrate with an insulating film interposed there between extends to partially overlap with the sealing material formation region. The sealing material adheres better with the inorganic alignment film than with the insulating film, and hence the adhesion is accordingly improved. Further, leaving part of the sealing material formation region free of the inorganic alignment film has an additional effect of creating a level difference from the inorganic alignment film which reduces the infiltration of moisture.

SUMMARY OF THE INVENTION

In manufacture of a liquid crystal display device that places a black matrix under a sealing material, when curing a layer of the sealing material that has been provided on a substrate by, for example, application, stress concentrates in the sealing material, thereby generating a force that acts to peel the black matrix already formed beneath the sealing material off of the substrate. The resultant problem is that the adhesion of the black matrix to the substrate is lessened.

As a countermeasure, the inventors of the present invention have considered dispersing stress that concentrates in the black matrix when the sealing material is cured by forming a slit or an opening in the black matrix below the sealing material.

JP 2008-176237 A, JP 2008-107488 A, and JP 2007-304273 A disclose similar structures, though not for the same purpose. In liquid crystal display devices disclosed in JP 2008-176237 A, JP 2008-107488 A, and JP 2007-304273 A, however, the slit or opening formed in the black matrix passes through the black matrix.

For that reason, the part of the black matrix that overlaps with the sealing material cannot block light sufficiently, allowing light emitted from a backlight, which is placed behind the liquid crystal display panel, to transmit through the sealing material and its vicinity, and thereby causing a problem of light leakage.

It is therefore an object of the present invention to provide a liquid crystal display device in which a black matrix (light-shielding film) overlapping with a sealing material is prevented from peeling off of a substrate and at the same time is improved in light-shielding reliability.

On the other hand, some types of liquid crystal display device have a structure in the vicinity of the sealing material that differs from those illustrated in JP 2007-256415 A, JP 2007-199341 A, and JP 2007-248743 A. In those types, the insulating film formed on the liquid crystal side of each substrate and extending to the sealing material formation region includes an inorganic insulating film placed on the front side, which is closer to the sealing material, and an organic insulating film placed below the inorganic insulating film brought into contact with the inorganic insulating film.

While the inorganic insulating film in this structure adheres well to the sealing material, adhesion at the interface between the inorganic insulating film and the organic insulation film is insufficient, thereby causing a problem in that the inorganic insulating film and the organic insulating film easily peel off from each other in the sealing material formation region.

Further, lead-out wiring for signal lines formed in the image display portion, a drive circuit for driving pixels in the image display portion, or the like may be formed below the insulating film in the sealing material formation region. A desirable structure in this case is one that does not impair functions of the insulating film which include a function of protecting the wiring or the circuit from a mechanical impact.

Another object of the present invention is to provide a liquid crystal display device that is improved in the substrate-side adhesion of a sealing material, that prevents the peeling of layered insulating films interposed between the sealing material and a substrate, and that is capable of protecting wiring or a circuit that is formed below the insulating films from a mechanical impact.

In a liquid crystal display device according to an aspect of the present invention, stress that concentrates when a sealing material is cured is dispersed by concave and convex portions formed on the sealing material side of a black matrix (the concave portion has a depth that is less than the thickness of the light-shielding film, in other words, the concave portion does not pass through the light-shielding film), to thereby reduce a force that acts to peel the black matrix off from a substrate. With this, the peeling of the black matrix from the substrate side can be avoided without forming a so-called through hole in the black matrix. In a liquid crystal display device according to another aspect of the present invention, an insulating film that extends to the sealing material formation region includes an inorganic insulating film placed on the front side, which is closer to the sealing material, and an organic insulating film placed below the inorganic insulating film brought into contact with the inorganic insulating film, and a recessed portion whose depth is set such that the inorganic insulating film is passed through but the organic insulating film is not is formed along the circumferential direction of the sealing material formation region.

For example, the present invention can be structured as follows.

(1) A liquid crystal display device according to one aspect of the present invention includes: a first substrate and a second substrate which are arranged so as to be opposed to each other and sandwich a liquid crystal; an image display portion which is formed by an aggregation of multiple pixels in a direction in which the liquid crystal spreads; a sealing material which is provided between the first substrate and the second substrate to surround the image display portion, and which seals the liquid crystal; and a light-shielding film which is formed on a liquid crystal side of the second substrate so that a part of the light-shielding film extends beyond the image display portion to overlap with the sealing material, and which has openings in the image display portion, at least in regions of the multiple pixels, in which the part of the light-shielding film that overlaps with the sealing material has a recessed portion formed on a sealing material side of the light-shielding film continuously or discontinuously along a circumferential direction of the sealing material, to a depth that is smaller than a thickness of the light-shielding film.

(2) In the liquid crystal display device according to Item (1), the sealing material may be a heat-curing sealing material.

(3) In the liquid crystal display device according to Item (1), the sealing material may be a photo-curing sealing material.

(4) In the liquid crystal display device according to Item (1), the recessed portion formed in the light-shielding film continuously or discontinuously along the circumferential direction of the sealing material may be provided so that multiple recessed portions are placed in a width direction of the sealing material.

(5) In the liquid crystal display device according to Item (1), in the part of the light-shielding film that overlaps with the sealing material, a plurality of the recessed portions may be scattered on the sealing material side of the light-shielding film.

(6) In the liquid crystal display device according to Item (1), an overcoat film may be formed on the liquid crystal side of the second substrate to cover the light-shielding film, and may be interposed between the light-shielding film and the sealing material.

(7) In the liquid crystal display device according to Item (6), on a side opposed to the sealing material, the overcoat film covering the light-shielding film may be leveled.

(8) In the liquid crystal display device according to Item (6), the overcoat film covering the light-shielding film may have surface irregularities which are formed on a side opposed to the sealing material and reflect the recessed portion formed in the light-shielding film.

(9) A liquid crystal display device according to another aspect of the present invention includes: a first substrate and a second substrate which are arranged so as to be opposed to each other and sandwich a liquid crystal; an image display portion which is formed by an aggregation of multiple pixels in a direction in which the liquid crystal spreads; a sealing material which is provide between the first substrate and the second substrate to surround the image display portion, and which seals the liquid crystal, in which one of wiring and a circuit and an insulating film, which covers one of the wiring and the circuit, are formed at least in a region of the first substrate where the sealing material is provided, in which the insulating film includes at least an inorganic insulating film placed on a front side, which is closer to the sealing material, and an organic insulating film placed below the inorganic insulating film brought into contact with the inorganic insulating film, and in which a recessed portion is formed in a sealing material formation region along a circumferential direction of the sealing material formation region, to a depth that makes the recessed portion pass through the inorganic insulating film but not the organic insulating film.

(10) In the liquid crystal display device according to Item (9), the recessed portion may be formed continuously along the circumferential direction of the sealing material.

(11) In the liquid crystal display device according to Item (10), the recessed portion may be formed such that multiple recessed portions are placed side by side in a width direction of the sealing material.

(12) In the liquid crystal display device according to Item (9), a plurality of the recessed portions may be formed discontinuously along the circumferential direction of the sealing material.

(13) In the liquid crystal display device according to Item (12), the recessed portion may be formed such that multiple recessed portions are placed side by side in a width direction of the sealing material.

(14) In the liquid crystal display device according to Item (9), at least one of the recessed portions may be formed in the width direction of the sealing material at any point in the circumferential direction of the sealing material.

(15) In the liquid crystal display device according to Item (9), the recessed portion may be formed such that dots of dot patterned recessed portion(s) are scattered on the sealing material formation region.

The structures described above are merely examples, and the present invention can be modified suitably without departing from its technical concept. Other structural examples of the present invention than those described above become clear from the overall description given herein or from the accompanying drawings.

A liquid crystal display device according to the one aspect of the present invention described above can prevent a black matrix (light-shielding film) arranged such that the black matrix overlaps with a sealing material from peeling off from a substrate, and at the same time can improve the light-shielding reliability of the black matrix. Further, a liquid crystal display device according to the another aspect of the present invention described above can improve the substrate-side adhesion of a sealing material, can prevent the peeling of layered insulating films which are interposed between the sealing material and a substrate, and can protect wiring or a circuit that is formed below the insulating films from a mechanical impact.

Other effects of the present invention become clear from the overall description given herein.

BRIEF DESCRIPTION OF THE DRAWINGS

In the accompanying drawings:

FIG. 2 is a plan view illustrating a black matrix of FIG. 1B;

DETAILED DESCRIPTION OF THE INVENTION

Figure 1A:
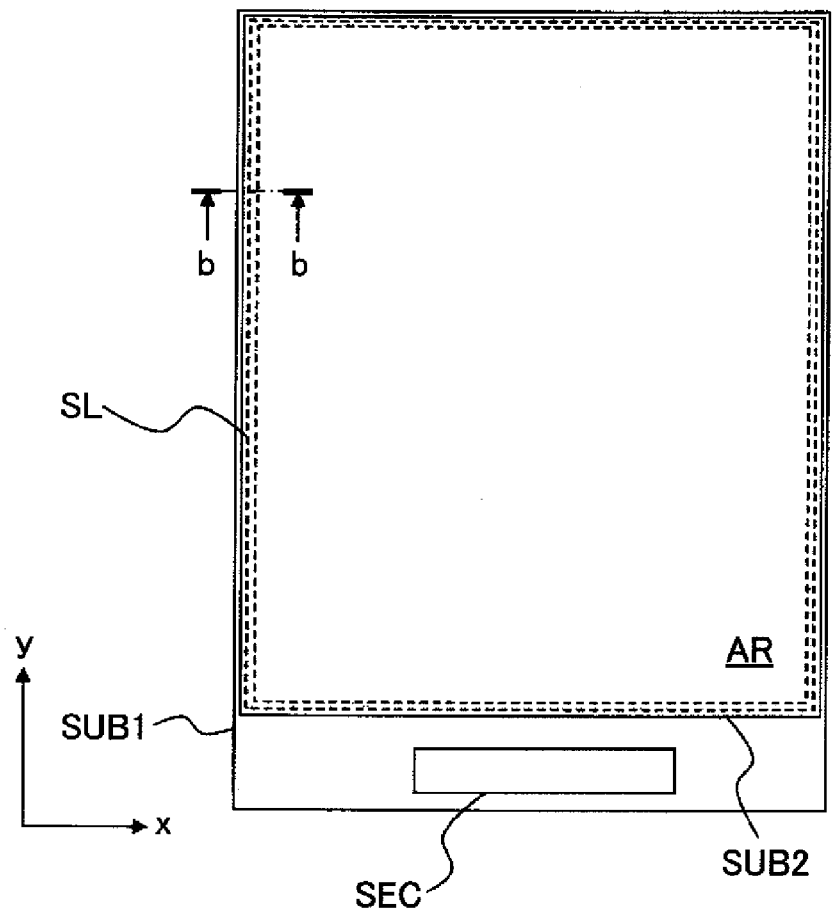
FIG. 1A is a diagram illustrating a structure of a liquid crystal display device according to a first embodiment of the present invention.

Embodiments of the present invention are described with reference to the drawings. In the drawings and the embodiments, components that are identical with or similar to each other are denoted by the same reference symbol in order to omit a description that has already been given.

[First Embodiment]

Figure 1B:
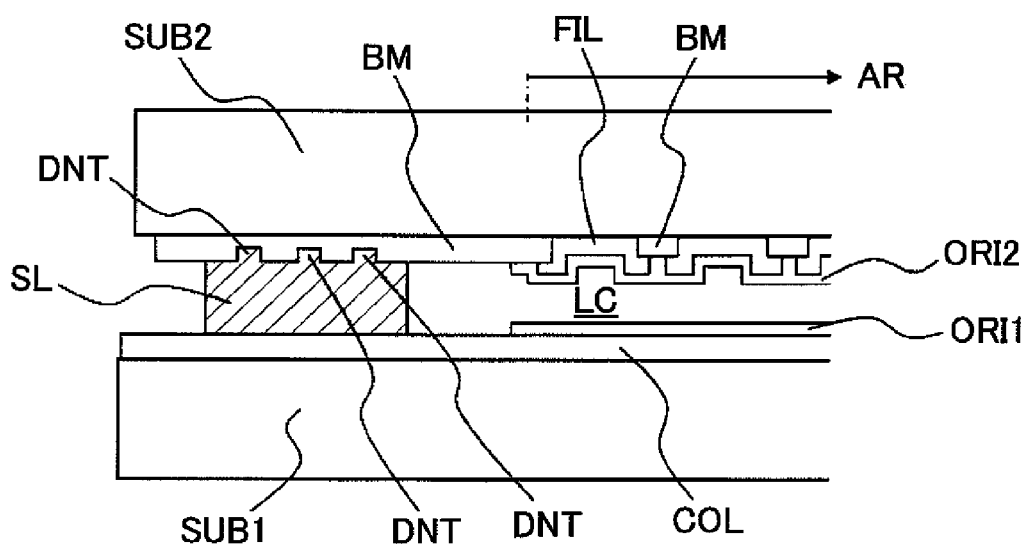
FIG. 1B is a sectional view taken along the line b-b of FIG. 1A.

FIGS. 1A and 1B are schematic structural diagrams illustrating a liquid crystal display device according to a first embodiment of the present invention. FIG. 1A illustrates a plan view and FIG. 1B illustrates a sectional view taken along the line b-b of FIG. 1A. The liquid crystal display device illustrated in FIGS. 1A and 1B is, for example, a liquid crystal display device for a cellular phone.

In FIG. 1A, a substrate SUB1 and a substrate SUB2 which are made of, for example, glass are arranged so as to be opposed to each other. The substrate SUB2 is smaller in area than the substrate SUB1, and arranged such that one of the four sides of the substrate SUB1, for example, the lower side in the drawing, is exposed. Along the lower side of the substrate SUB1 in the drawing, a semiconductor device (chip) SEC for driving pixels is mounted face down.

A liquid crystal LC (see FIG. 1B) is sandwiched between the substrate SUB1 and the substrate SUB2. The liquid crystal LC is sealed by a sealing material SL, which forms a circular pattern along the perimeter of the substrate SUB2 and has a double function of fixedly bonding the substrate SUB1 and the substrate SUB2 together. The sealing material SL is provided on a surface on the substrate SUB2 side into the above-mentioned pattern by application with the use of an ink jet method, a dispenser, or screen printing, for example. The sealing material SL is a photo-curing sealing material which is cured by, for example, ultraviolet ray irradiation, or a heat-curing sealing material which is cured by heat, and is cured after the substrate SUB1 is arranged so as to be opposed to the substrate SUB2.

An image display portion AR is formed in a region that is on the liquid crystal LC side of each of the substrates SUB1 and SUB2 and that is surrounded by the sealing material SL. The image display portion AR is in a direction in which the liquid crystal LC spreads, and includes an aggregation of multiple pixels whose components include the liquid crystal LC.

That is, as illustrated in FIG. 1B, the liquid crystal LC side of the substrate SUB1 has a circuit forming layer COL in which a patterned metal film, a patterned insulating film, a patterned semiconductor film, and the like are layered to build an electronic circuit (not shown). The circuit forming layer COL has pixel-selecting thin-film transistors, pixel electrodes, and others in multiple pixel regions, which are defined by signal lines (scanning signal lines and video signal lines). A liquid crystal display device that includes a pair of electrodes (pixel electrode and counter electrode) in each pixel region on the substrate SUB1 side is called an in-plane switching (IPS) type or a lateral field type, and an electric field generated between these electrodes drives the molecules of the liquid crystal LC. However, the present invention is not limited to in-plane switching (IPS) or lateral field types and is applicable to vertical field types as well, where one of the electrodes (specifically, counter electrode) is formed on the substrate SUB2 side. The circuit forming layer COL is also formed on the surface of the substrate SUB1 outside the sealing material SL. Other components formed in the circuit forming layer COL include lead-out wiring which connects the signal lines (scanning signal lines and video signal lines) within the image display portion AR with an output electrode of the semiconductor device.

An alignment film ORI1 is formed on the liquid crystal LC side of the circuit forming layer COL in the region of the image display portion AR. The alignment film ORI1 determines the initial orientation of the molecules of the liquid crystal LC, together with an alignment film ORI2, which is formed on the substrate SUB2 side and is described later.

A black matrix BM is formed on the liquid crystal LC side of the substrate SUB2. The black matrix BM includes, for example, a resin film that contains a black pigment. FIG. 2 is a plan view illustrating focusing on the black matrix BM. In FIG. 2, openings (holes) HL are formed in a region of the black matrix BM that corresponds to the image display portion AR (region framed by the dot-dash line in the drawing) such that each pixel region is opposed to one of the openings HL. The black matrix BM blocks light between adjacent pixels, thereby improving the contrast.

The black matrix BM extends beyond the region corresponding to the image display portion AR (region framed by the dot-dash line in the drawing) and reaches further than, for example, a region SL' (region framed by a dotted line SL' in the drawing) where the sealing material SL is provided. This is for avoiding light leakage caused by light that is emitted from a backlight (not shown) on the rear side of the liquid crystal display device and transmitted through the sealing material SL and its vicinity.

In the region for providing the sealing material SL which is framed by the dotted line SL' in the drawing, the black matrix BM has a circular recessed portion (concave portion with a depth that is less than the thickness of the black matrix BM, in other words, concave portion that does not pass through the black matrix BM) DNT along the circumferential direction of the region SL'. The recessed portion DNT runs along the circumferential direction of the region SL' for providing the sealing material SL and is formed, for example, continuously. The thus shaped recessed portion DNT is arranged such that three recessed portions DNT, for example, are placed side by side in the width direction of the region SL' for providing the sealing material SL (the number of the side-by-side recessed portions DNT is not particularly limited and may be one, two, or four or more). Each recessed portion DNT, which, in FIG. 2, is represented by a thin line, has enough width as illustrated in FIG. 1B, which provides an enlarged view of the recessed portions DNT. The recessed portions DNT create a concave-convex surface that has substantially evenly distributed surface irregularities all over a region of the black matrix BM that overlaps with the sealing material SL.

As described above, the black matrix BM has the openings HL, which are through holes, and the recessed portions DNT, which are not through holes. The openings HL and the recessed portions DNT may be formed simultaneously by selective etching through photolithography that uses halftone exposure, for example. With this, the photolithography needs to be performed only once.

A color filter FIL (see FIG. 1B) is formed on a surface of the black matrix BM, which is formed on the liquid crystal side of the substrate SUB2, in the region that corresponds to the image display portion AR, covering the openings HL of the black matrix BM. In FIG. 2, for example, the color filter FIL includes belt-like color filters each of which covers a column of the openings HL placed side by side in a direction y in the drawing, so that the color of a color filter is common to all openings HL that are in the same column. The belt-like color filters are arranged in a direction x in the drawing in the repetitive order of, for example, red (R), green (G), and blue (B). In this manner, three pixels adjacent to one another in the direction x each assume one of the colors red, green, and blue, and together constitute a unit pixel for color display.

The alignment film ORI2 is formed on the liquid crystal sides of the black matrix BM and the color filter FIL within the image display portion AR. As described above, the alignment film ORI2 determines the initial orientation of the molecules of the liquid crystal LC together with the alignment film ORI1 formed on the substrate SUB1 side.

FIG. 1B illustrates that the part of the black matrix BM that extends beyond the image display portion AR overlaps with the sealing material SL, and that the sealing material SL is provided so as to be opposed to each and every recessed portion DNT formed in the black matrix BM. In this case, the sealing material SL is provided such that the material of the sealing material SL fills the insides of the recessed portions DNT formed in the black matrix BM.

Figure 3:
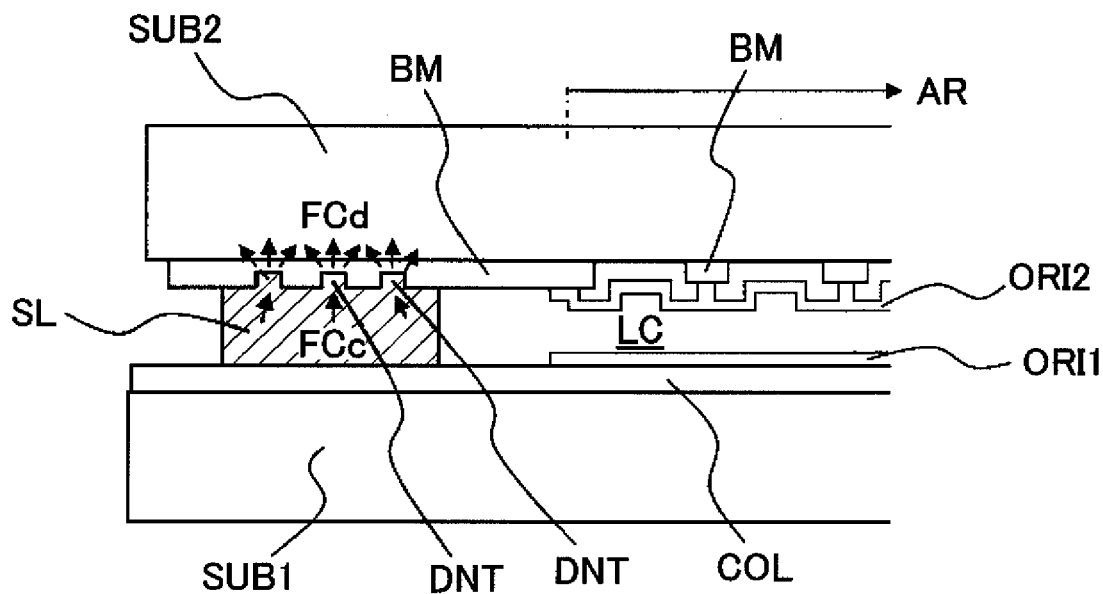
FIG. 3 is an explanatory diagram illustrating that concentrated stress generated in a sealing material is turned into dispersed stress, which is dispersed in multiple directions, in the process of being transmitted to the black matrix side.

FIG. 3 is an explanatory diagram illustrating that, in the structure illustrated in FIG. 1B, a stress (concentrated stress) FCc is turned into a stress (dispersed stress) FCd in the process of being transmitted to the black matrix BM side. The stress FCc is generated in the sealing material SL when the sealing material SL applied is cured by heat, UV irradiation, or the like. The stress FCd is dispersed in multiple directions by the recessed portions DNT. The recessed portions DNT create a concave-convex surface at the interface between the black matrix BM and the sealing material SL. A force vectored in a direction perpendicular to the side walls of the concave-convex surface generates the dispersed stress FCd. Accordingly, the dispersed stress FCd transmitted to the black matrix BM hardly functions as a force that acts to peel the black matrix BM off from the substrate SUB2. Therefore, the peeling of the black matrix BM from the substrate SUB2 is prevented.

In this case, to generate the dispersed stress FCd described above, the concave-convex surface at the interface between the black matrix BM and the sealing material SL may be formed, and a sufficient function is obtained by forming at least one recessed portion (concave portion with a depth that is smaller than the thickness of the black matrix BM) DNT, without forming a through hole in the black matrix BM. Therefore, forming the recessed portion DNT does not impair the light blocking ability of the black matrix BM and prevents light leakage in the sealing material SL and its vicinity.

The liquid crystal display device according to the first embodiment of the present invention can employ any one of a photo-curing sealing material and a heat-curing sealing material. A heat-curing sealing material has an advantage in that the sealing material is cured sufficiently without a through hole formed in the black matrix BM. A feature of a photo-curing sealing material, which is generally larger in stress that is generated when the sealing material is cured and shrunk than a heat-curing sealing material, is that effects of the structure according to the first embodiment of the present invention are more prominent. In the case where a photo-curing sealing material is employed, the sealing material is cured by irradiating light from the substrate SUB1 side, where the black matrix BM is not formed.

[Second Embodiment]

Figure 4:
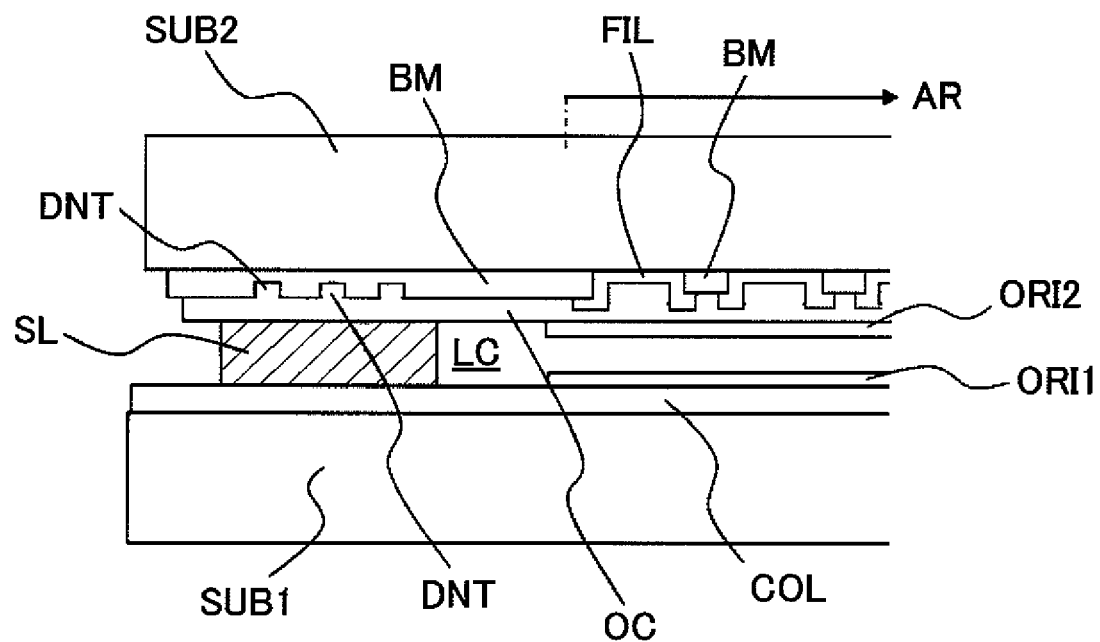
FIG. 4 is a sectional view illustrating a structure of a liquid crystal display device according to a second embodiment of the present invention.

FIG. 4 is a schematic sectional view illustrating a liquid crystal display device according to a second embodiment of the present invention, and is drawn in a manner that corresponds to FIG. 1B.

FIG. 4 differs from FIG. 1B in that an overcoat film OC is formed on the liquid crystal side of the substrate SUB2 to cover the black matrix BM and the color filter FIL. The overcoat film OC is formed when, for example, the liquid crystal LC side of the substrate SUB2 is to be leveled. The overcoat film OC is, for example, a resin layer formed by application.

The overcoat film OC also covers a region of the black matrix BM where the recessed portions DNT are formed, and the sealing material SL provided so as to be opposed to this region for forming the recessed portions DNT abuts the overcoat film OC. In other words, the overcoat film OC is interposed between the black matrix BM and the sealing material SL. In addition, in the second embodiment, the overcoat film OC is formed relatively thick, with the result that a part of the overcoat film OC that covers the recessed portions DNT of the black matrix BM has a flat surface. Further, the alignment film ORI2 is formed on the liquid crystal side of the overcoat film OC in the image display portion AR. The rest of the liquid crystal display device according to the second embodiment is substantially the same as in the first embodiment, and descriptions on the similar points are omitted.

In the thus structured liquid crystal display device, a stress generated in the sealing material SL when the sealing material SL applied is cured by heat, UV irradiation, or the like (corresponding to the concentrated stress FCc of FIG. 3) is transmitted into the overcoat film OC substantially as it is. The stress, however, is turned into a stress that is dispersed in multiple directions by the recessed portions DNT (corresponding to the dispersed stress FCd of FIG. 3), in the process of being transmitted to the black matrix BM side. Therefore, as in the first embodiment, the dispersed stress transmitted to the black matrix BM hardly functions as a force that acts to peel the black matrix BM off from the substrate SUB2, and the peeling of the black matrix BM from the substrate SUB2 is prevented.

[Third Embodiment]

Figure 5:
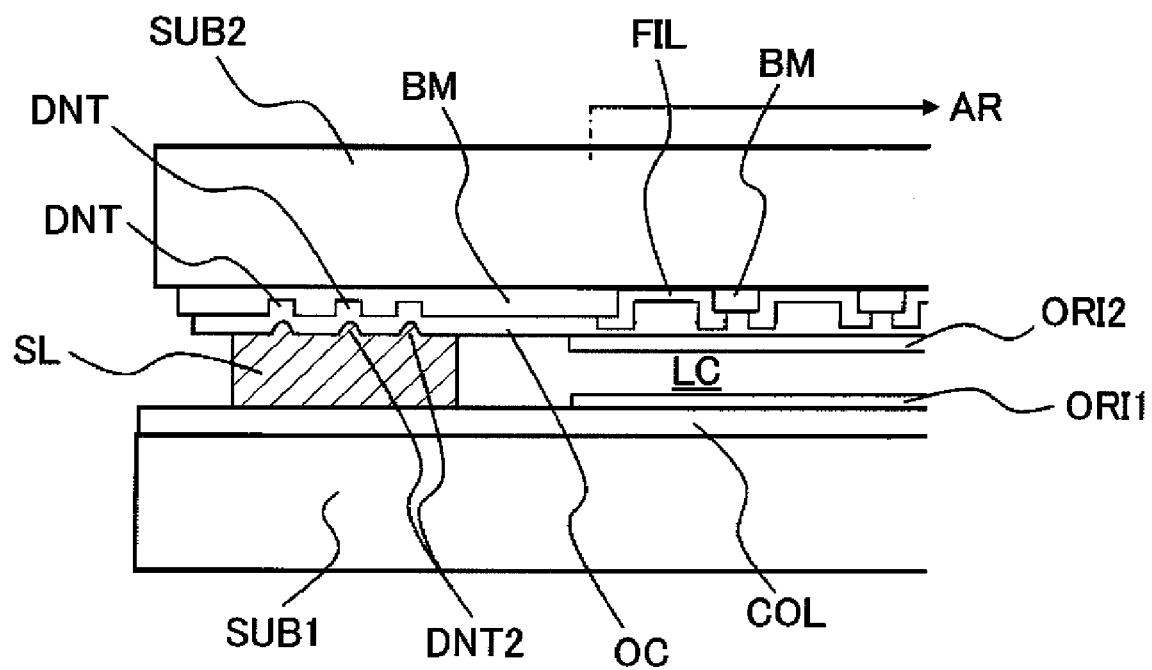
FIG. 5 is a sectional view illustrating a structure of a liquid crystal display device according to a third embodiment of the present invention.

FIG. 5 is a schematic sectional view illustrating a liquid crystal display device according to a third embodiment of the present invention, and is drawn in a manner that corresponds to FIG. 4.

FIG. 5 differs from FIG. 4 in that the overcoat film OC is formed relatively thin so that a part of the overcoat film OC that covers the recessed portions DNT of the black matrix BM has surface irregularities reflecting the recessed portions DNT. Recessed portions (denoted by reference symbol DNT2 in FIG. 5) are thus formed in the overcoat film OC in places that coincide with the recessed portions DNT. The rest of the liquid crystal display device according to the third embodiment is substantially the same as in the second embodiment, and descriptions on the similar points are omitted.

In the thus structured liquid crystal display device, too, a concave-convex surface is formed at the interface between the sealing material SL and the overcoat film OC along a force transmission path from the sealing material SL to the black matrix BM, and, because this concave-convex surface, too, has a function of dispersing a concentrated stress transmitted from the sealing material SL (corresponding to the concentrated stress FCc of FIG. 3), the same effects as in the second embodiment are obtained.

[Fourth Embodiment]

Figure 6:
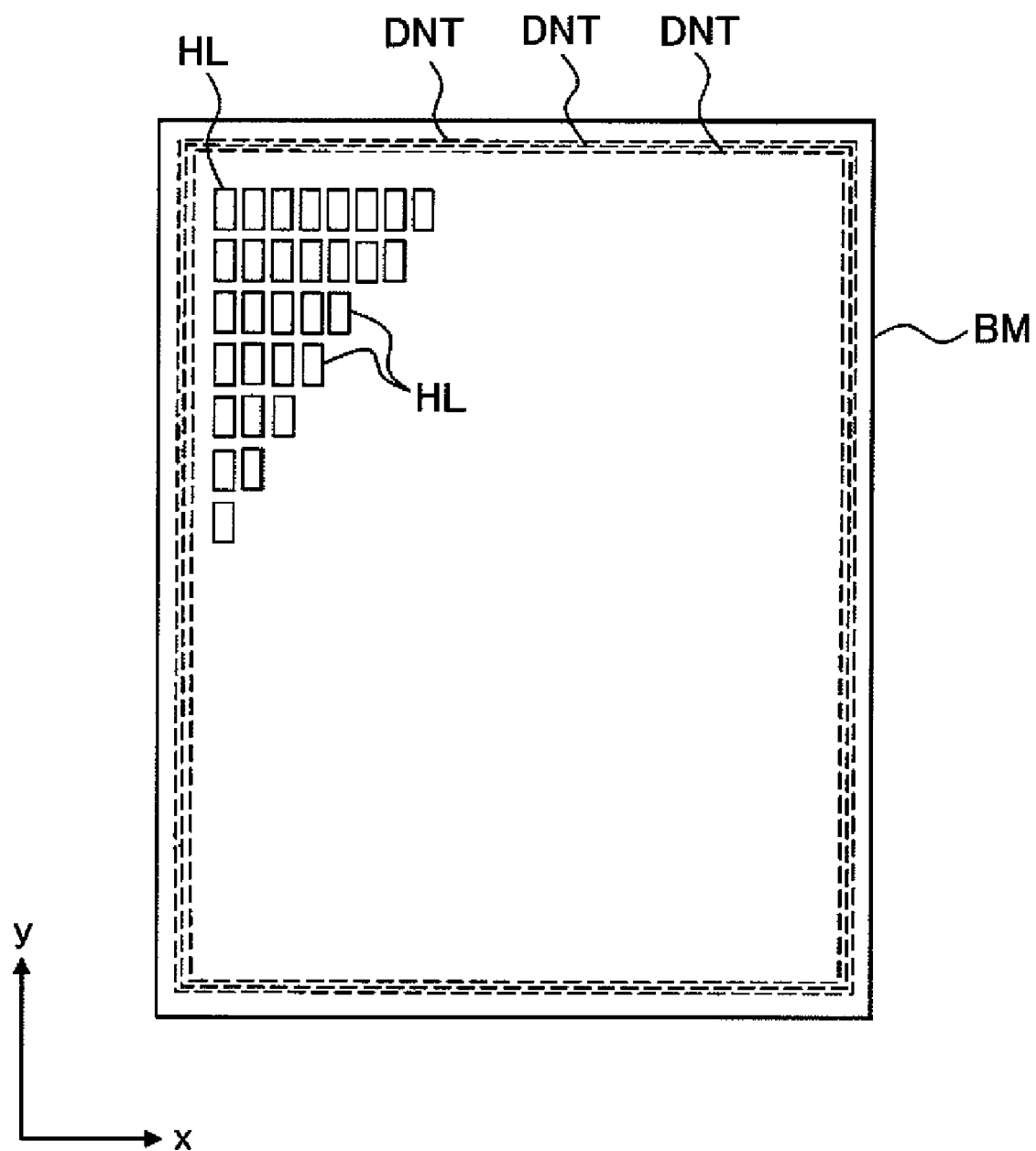
FIG. 6 is a plan view of a black matrix that illustrates a structure of a liquid crystal display device according to a fourth embodiment of the present invention.

FIG. 6 is a structural diagram illustrating a liquid crystal display device according to a fourth embodiment of the present invention, and presents a plan view of the black matrix BM. FIG. 6 is drawn in a manner that corresponds to FIG. 2. The image display portion AR and the region SL' for providing the sealing material SL which are illustrated in FIG. 2 are omitted from FIG. 6.

FIG. 6 differs from FIG. 2 in that each recessed portion DNT is formed along the region for providing the sealing material SL discontinuously. The rest of the liquid crystal display device according to the fourth embodiment is substantially the same as in the first embodiment, and descriptions on the similar points are omitted. This is because a stress can be dispersed locally in the region for providing the sealing material SL, and it is sufficient if the stress-dispersing portions are provided scatteringly.

In FIG. 6, three recessed portions DNT, each of which is formed discontinuously along the region for providing the sealing material SL, are placed in the width direction of the sealing material SL. However, the number of the side-by-side recessed portions DNT is not particularly limited as in the first embodiment.

[Fifth Embodiment]

Figure 7:
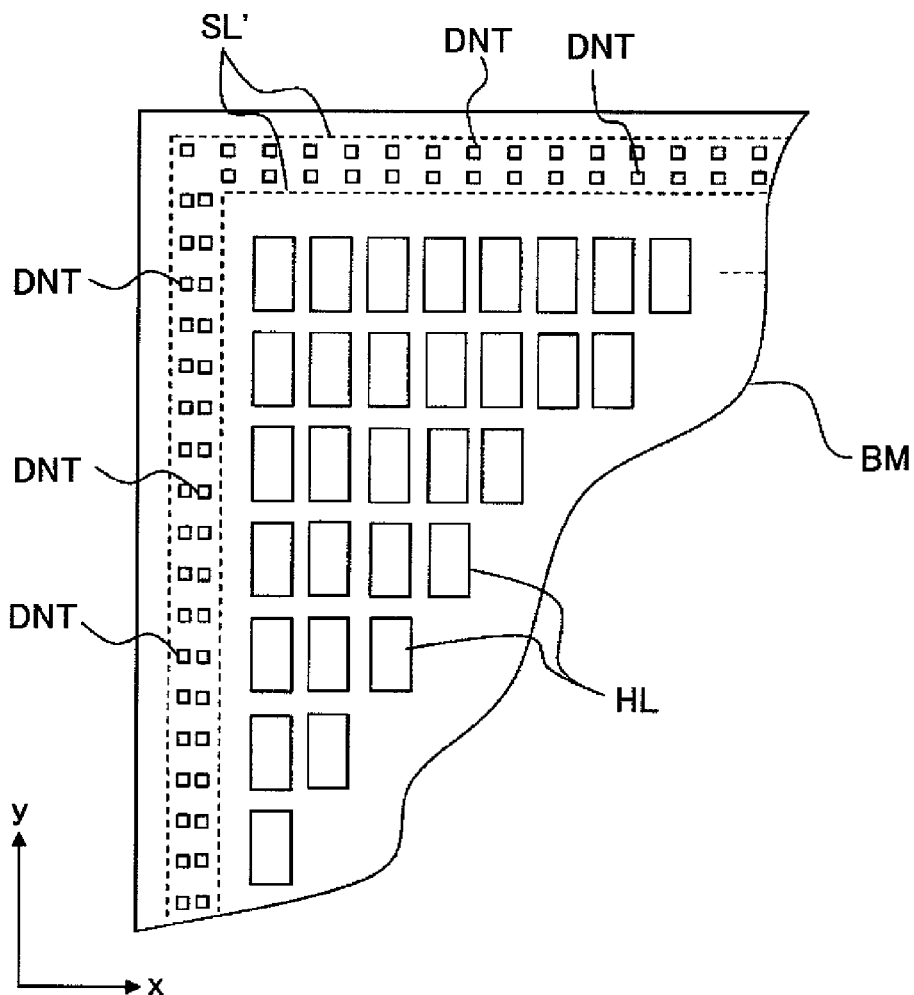
FIG. 7 is a plan view of a black matrix that illustrates a structure of a liquid crystal display device according to a fifth embodiment of the present invention.

FIG. 7 is a structural diagram illustrating a liquid crystal display device according to a fifth embodiment of the present invention, and presents a plan view of the black matrix BM. FIG. 7 is drawn in a manner that corresponds to FIG. 6, and illustrates an enlarged view of the upper left part of the black matrix BM.

FIG. 7 differs from FIG. 6 in that the recessed portions DNT formed in the region SL' for providing the sealing material SL each have a dot pattern, and are arranged such that dots of the dot-patterned recessed portions DNT are scattered substantially evenly throughout the region SL'. This is for forming a concave-convex surface that has evenly distributed surface irregularities in a region of the black matrix BM where the sealing material SL is provided, and using the concave-convex surface to disperse a concentrated stress transmitted from the sealing material SL. The rest of the liquid crystal display device according to the fifth embodiment is substantially the same as in the fourth embodiment, and descriptions on the similar points are omitted.

In FIG. 7, the dots of the dot-patterned recessed portion DNT are rectangular, but are not limited thereto and may have a round shape or other shapes. Further, the recessed portions DNT may be arranged along the region for providing the sealing material SL such that the dot pattern of one recessed portion DNT is staggered from the dot pattern of another recessed portion DNT.

[Sixth Embodiment]

Figure 8:
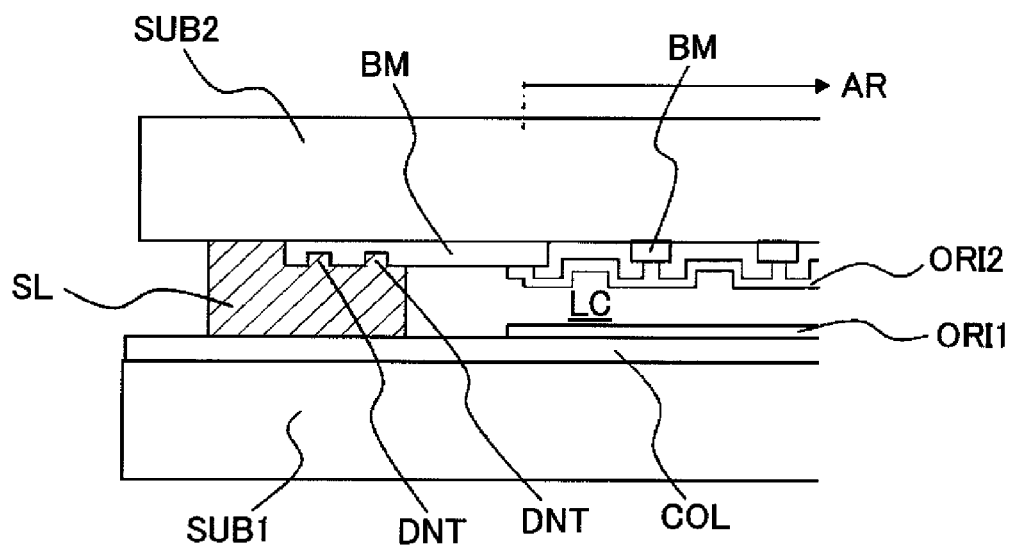
FIG. 8 is a sectional view illustrating a liquid crystal display device according to a sixth embodiment of the present invention.

FIG. 8 is a sectional view illustrating a liquid crystal display device according to a sixth embodiment of the present invention, and corresponds to FIG. 1B.

A difference of FIG. 8 from FIG. 1B resides in the black matrix BM. The difference is that the black matrix BM is patterned such that the part of the black matrix BM extending beyond the image display portion AR reaches a midpoint in the width direction of the sealing material SL. In other words, the part of the black matrix BM that extends beyond the image display portion AR does not always need to reach further than the region for providing the sealing material SL.

However, in this case, too, the recessed portions DNT are formed in the part of the black matrix BM that overlaps with the sealing material SL as in the embodiments described above. The thus structured liquid crystal display device may have the overcoat film OC as the one illustrated in FIG. 3 or FIG. 4. The rest of the liquid crystal display device according to the sixth embodiment is substantially the same as in the first embodiment, and descriptions on the similar points are omitted.

[Seventh Embodiment]

The black matrices BM of the embodiments described above have such a pattern that light is blocked between each opening HL and another opening HL that is above or below, or to the left or right of, the former opening HL as illustrated in FIG. 6, in other words, have a lattice pattern in the image display portion AR.

Alternatively, a black matrix pattern may be employed that has slit-like openings each of which is shared by a row of pixels placed side by side in the direction x in the drawing, and that blocks light only between the openings placed side by side in the direction y in the drawing (in short, horizontal stripe pattern light-shielding film). Similarly, a black matrix pattern may be employed that has slit-like openings each of which is shared by a column of pixels placed side by side in the direction y in the drawing, and that blocks light only between the openings placed side by side in the direction x in the drawing (in short, vertical stripe pattern light-shielding film). The rest of the liquid crystal display device according to the seventh embodiment is substantially the same as in the first embodiment, and descriptions on the similar points are omitted.

[Eighth Embodiment]

The black matrices BM in the first to seventh embodiments described above are made from a resin film. The black matrix material is not limited thereto, and a black matrix made from a metal film such as a chromium (Cr) film may also be employed.

[Ninth Embodiment]

(Overall Schematic Structure)

Figure 10A:
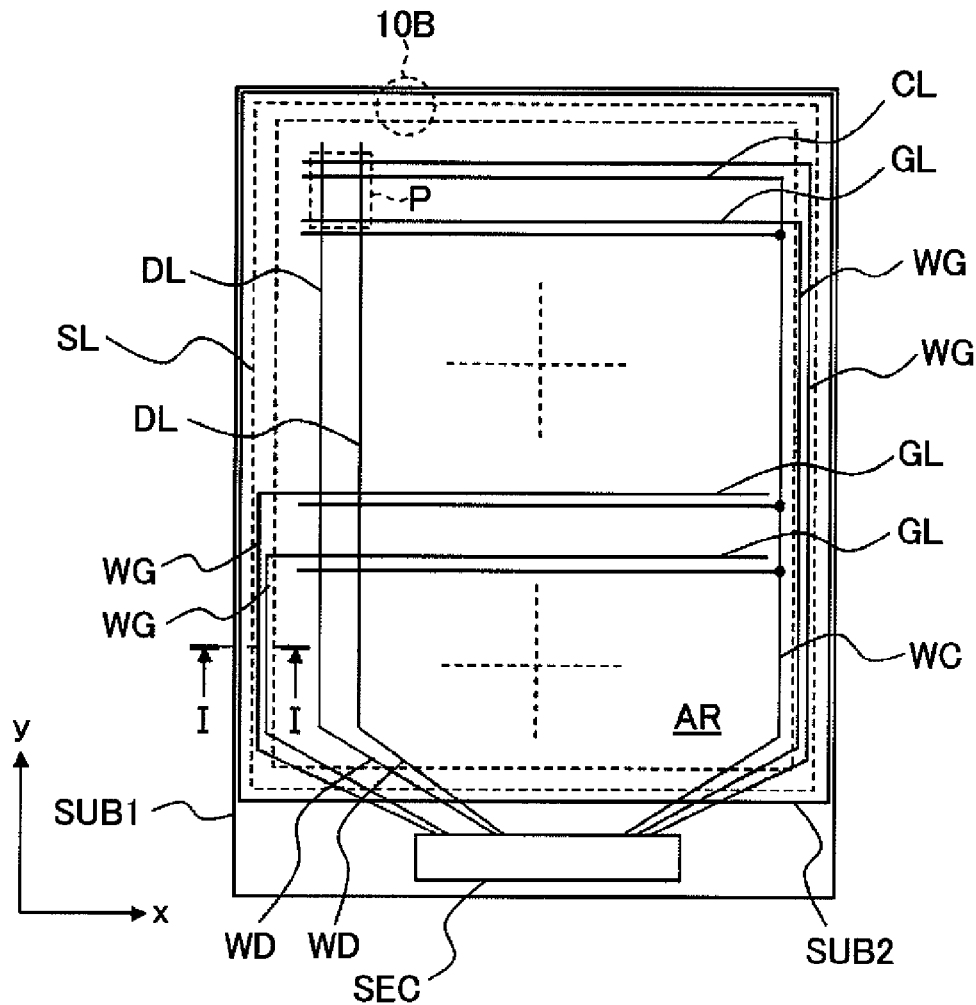
FIG. 10A is a plan view illustrating the liquid crystal display device according to the ninth embodiment of the present invention.

FIG. 10A is a plan view illustrating a liquid crystal display device according to a ninth embodiment of the present invention. The liquid crystal display device illustrated in FIG. 10A is, for example, a liquid crystal display device for a cellular phone.

In FIG. 10A, the substrate SUB1 and the substrate SUB2 which are made of, for example, glass are arranged so as to be opposed to each other. The substrate SUB2 is smaller in area than the substrate SUB1, and arranged such that one of the four sides of the substrate SUB1, for example, the lower side in the drawing, is exposed. Along the lower side of the substrate SUB1 in the drawing, a semiconductor device (chip) SEC for driving pixels is mounted face down.

A liquid crystal LC (see FIG. 9) is sandwiched between the substrate SUB1 and the substrate SUB2. The liquid crystal LC is sealed by the sealing material SL, which forms a circular pattern along the perimeter of the substrate SUB2 and has a double function of fixedly bonding the substrate SUB1 and the substrate SUB2 together (the sealing material SL has, for example, a thickness of 3 to 4 μm and a width of 700 μm). The sealing material SL is provided on a surface on the substrate SUB2 side into the above-mentioned pattern by application with the use of an ink jet method, a dispenser, or screen printing, for example.

Gate signal lines GL and drain signal lines DL are formed in a region that is on the liquid crystal LC side of the substrate SUB1 and that is surrounded by the sealing material SL. The gate signal lines GL run in a direction x in the drawing and are parallel to one another in a direction y in the drawing. The drain signal lines DL run in the direction y in the drawing and are parallel to one another in the direction x in the drawing. A pixel region is a region surrounded by a pair of adjacent gate signal lines GL and a pair of adjacent drain signal lines DL, and an image display portion AR is formed within a region including an aggregation of pixel regions which are arranged in a matrix pattern. The liquid crystal display device of this embodiment is called an in-plane switching (IPS) type or a lateral field type, and has common signal lines CL each of which is formed between a pair of adjacent gate signal lines GL. Pixel electrodes (denoted by reference symbol PX in FIG. 11), which are described later, in this embodiment are accordingly formed on the substrate SUB1 side together with counter electrodes (denoted by reference symbol CT in FIG. 11), which are connected to the common signal lines CL. The counter electrodes CT themselves may double as the common signal lines CL.

Figure 11:
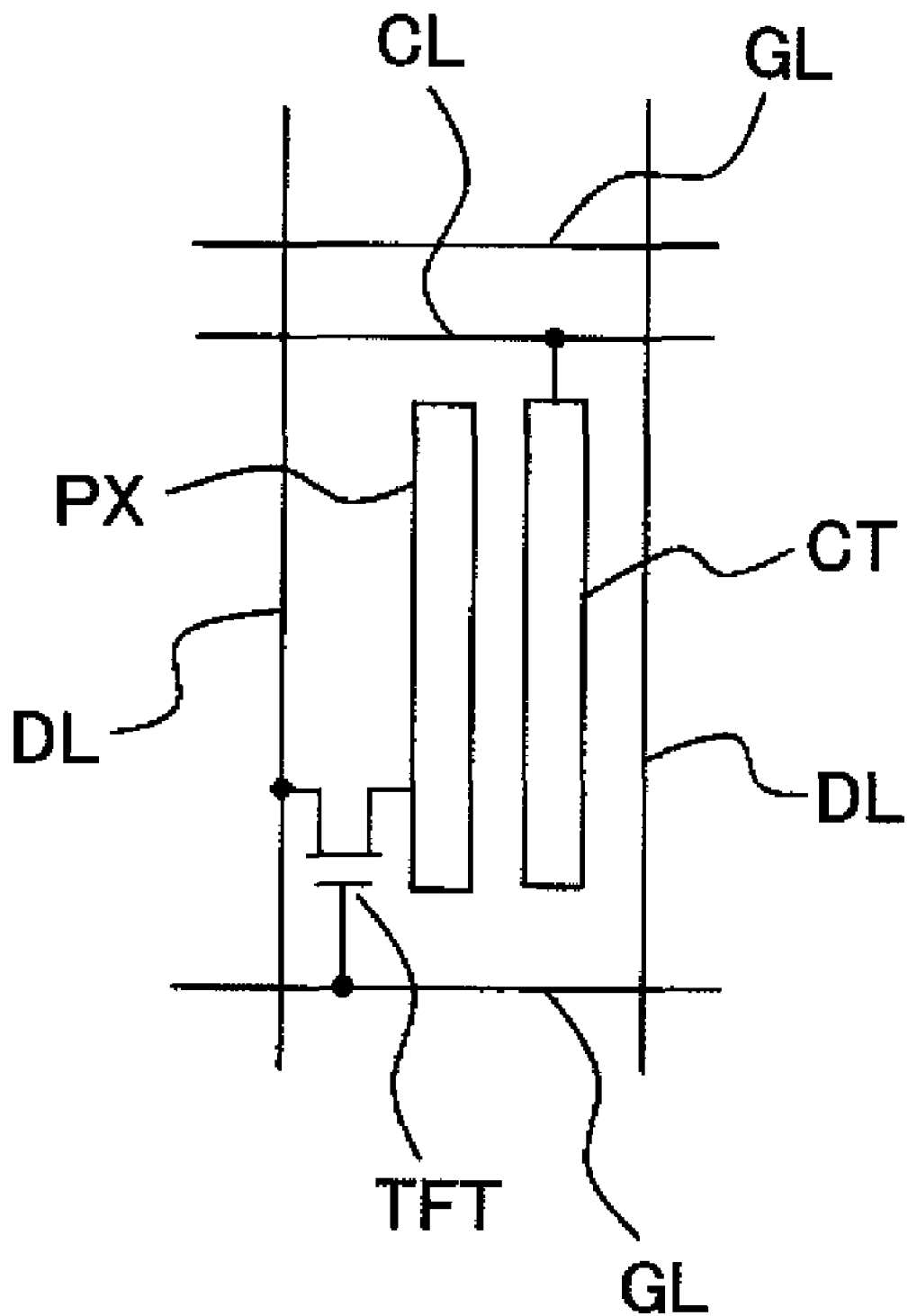
FIG. 11 is a diagram illustrating an equivalent circuit in a pixel of the liquid crystal display device according to the ninth embodiment of the present invention.

FIG. 11 is a diagram illustrating an equivalent circuit in each pixel and illustrates, for example, a circuit framed by a dotted line P of FIG. 10A. The pixel region includes a thin-film transistor TFT, which is turned on by a signal from one of the gate signal lines GL (scanning signal), a pixel electrode PX, which receives a signal supplied from one of the drain signal lines DL (video signal) via the thin-film transistor TFT when the thin-film transistor TFT is turned on, and a counter electrode CT, which generates an electric field with the pixel electrode PX. A signal that serves as the reference with respect to a video signal (a reference signal) is supplied to the counter electrode CT via the common signal line CL.

A lead-out wiring line WG (herein, may be simply referred to as wiring (line) in this description) is led out of, for example, one end of each gate signal line GL, and connected to an output electrode of the semiconductor device SEC. In this embodiment, the lead-out wiring line WG is led out of the right end of the gate signal line GL that is formed upper part of the image display portion AR in the drawing, and led out of the left end of the gate signal line GL that is formed under part of the image display portion AR in the drawing. However, the present invention is not limited thereto and the lead-out wiring line WG may be led out of the same end in every gate signal line GL. The lead-out wiring lines WG, which are connected to the semiconductor device SEC, are formed so that the lead-out wiring lines WG consequently intersect the lower side of a region where the sealing material SL is provided. Before the lead-out wiring lines WG intersect the lower side of the region for providing the sealing material SL, some of the lead-out wiring line WG overlap with the left side or right side of the region for providing the sealing material SL, and also run along the sealing material formation region. This is for making the frame region smaller and allowing the image display portion AR to take up as large an area as possible. A lead-out wiring line WD (herein, may be simply referred to as wiring (line) in this description) is led out of, for example, the bottom end of each drain signal line DL in the drawing. The lead-out wiring lines WD are connected to the semiconductor device SEC, and are formed so that the lead-out wiring lines WD consequently intersect the region for providing the sealing material SL. A common lead-out wiring line WC (herein, may be simply referred to as wiring (line) in this description) is led out of, for example, the right end of each common signal line CL in the drawing. The lead-out wiring lines WC are connected to the semiconductor device SEC, and are formed so that the lead-out wiring lines WC consequently intersect the region for providing the sealing material SL.

[Pixel Structure]

Figure 12A:
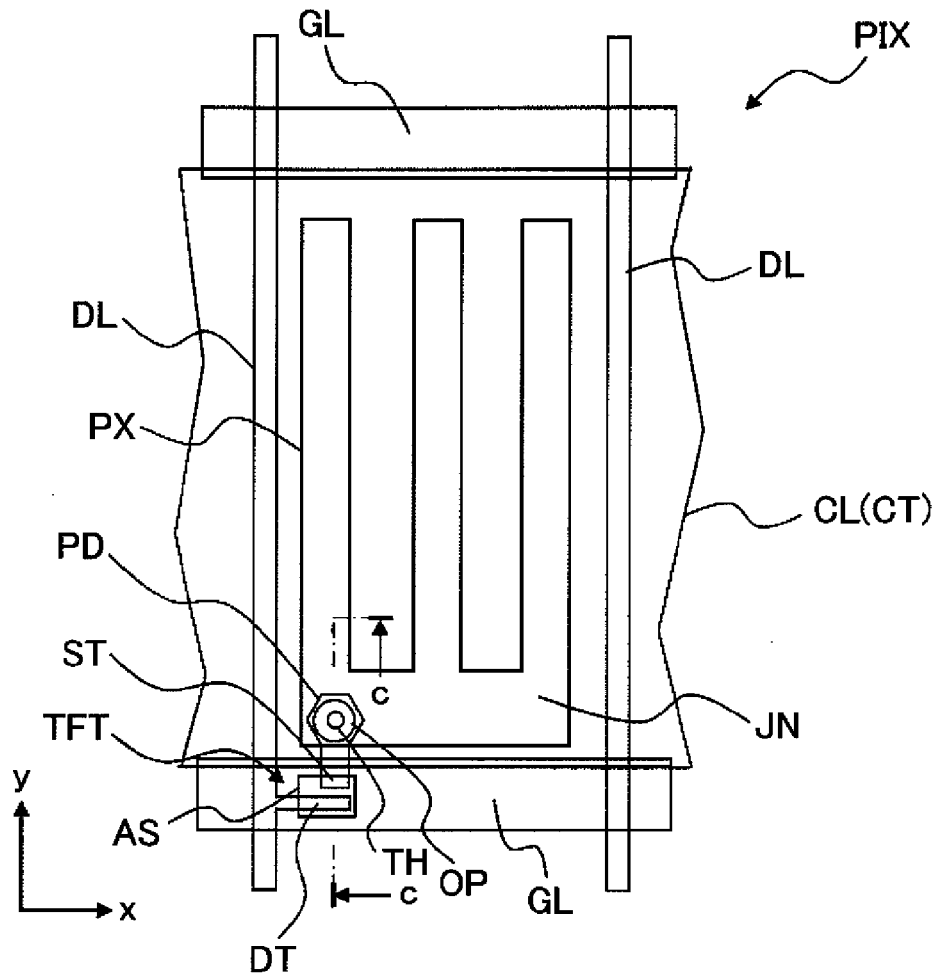
FIG. 12A is a diagram illustrating the structure of a pixel which is formed on the liquid crystal side of one of substrates of the liquid crystal display device according to the ninth embodiment of the present invention.
Figure 12B:
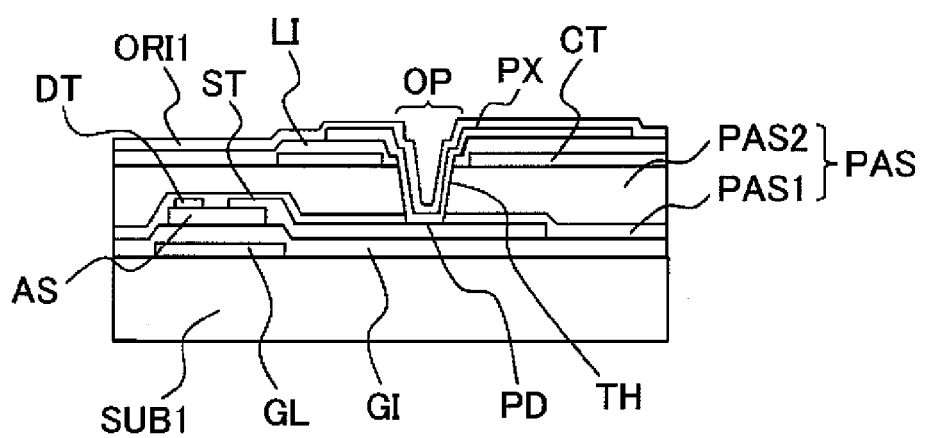
FIG. 12B is a diagram illustrating the structure of a pixel which is formed on the liquid crystal side of one of the substrates of the liquid crystal display device according to the ninth embodiment of the present invention.

FIGS. 12A and 12B are diagrams illustrating the structure of a pixel which is formed on the liquid crystal side of the substrate SUB1, and illustrates the structure of the part framed by the dotted line P of FIG. 10A. FIG. 12A is a plan view and FIG. 12B is a sectional view taken along the line c-c of FIG. 12A.

The gate signal lines GL, which run in the direction x in the drawing and are parallel to one another in the direction y, are formed on the liquid crystal side of the substrate SUB1. On this surface of the substrate SUB1, a insulating film GI is formed to cover the gate signal lines GL, and functions as a gate insulating film in a region for forming the thin-film transistor TFT, which is described later.

A semiconductor layer AS is formed in an island shape from, for example, amorphous Si, on a surface of the insulating film GI where the region for forming the thin-film transistor TFT overlaps with a part of the gate signal line GL. The thin-film transistor TFT is a metal insulator semiconductor (MIS) type transistor having a reverse staggered structure in which a drain electrode DT and a source electrode ST arranged so as to be opposed to each other are formed on a surface of the semiconductor layer AS, and the part of the gate signal line GL serves as a gate electrode.

The drain signal lines DL, which run in the direction y in the drawing and are parallel to one another in the direction x, are formed on the surface of the substrate SUB1. A part of each drain signal DL is extended to the surface of the semiconductor layer AS, and hence the extended part serves as the drain electrode DT of the thin-film transistor TFT. At the same time the drain signal lines DL are formed, the source electrode ST of the thin-film transistor TFT is formed. The source electrode ST is equipped with a pad portion PD, which extends to the pixel region beyond the region for forming the semiconductor layer AS. The pad portion PD is electrically connected to the pixel electrode PX, which is described later.

A protective film PAS is formed on the surface of the substrate SUB1 to cover the drain signal lines DL and other underlying components. The protective film PAS includes an insulating film for avoiding a direct contact between the thin-film transistor TFT and the liquid crystal. For example, the protective film PAS has a laminate structure of a protective film PAS1, which is an inorganic insulating film (with a thickness of, e.g., 300 nm), and a protective film PAS2, which is an organic insulating film (with a thickness of, e.g., 2,000 nm). The use of an organic insulating film as the protective film PAS2 is for obtaining an effect of, for example, leveling a surface of the protective film PAS.

On the surface of the protective film PAS, each common signal line CL is formed between a pair of adjacent gate signal lines GL along a direction in which the gate signal lines run. Each common signal line CL covers substantially the entirety of one of pixel regions which are placed side by side in the direction x in the drawing, and doubles as the counter electrode CT in the pixel region. The common signal line CL (counter electrode CT) is formed from a light-transmissive conductive film made of, for example, indium tin oxide (ITO).

An interlayer insulating film LI which is an inorganic insulating film (with a thickness of, e.g., 300 nm) is formed on the surface of the substrate SUB1 to cover the common signal line CL (counter electrode CT). The pixel electrode PX is formed in each pixel region on the top surface of the interlayer insulating film LI. The pixel electrode PX contains multiple (three in FIG. 12A) linear electrodes which run in the direction y in the drawing and are parallel to one another in the direction x. The linear electrodes respectively include junction portions JN connected to one another at the end that is close to the thin-film transistor TFT. The pixel electrode PX is formed from a light-transmissive conductive film made of, for example, indium tin oxide (ITO). Part of the junction portions JN of the pixel electrode PX is electrically connected to the pad portion PD of the source electrode ST through a though hole TH, which is formed in the interlayer insulating film LI and in the protective film PAS. Further, in this case, an opening OP which is substantially concentric with the through hole TH and which is larger enough in diameter than the through hole TH is formed in the common signal line CL (counter electrode CT) in advance, in order to avoid an electric short between the pixel electrode PX and the counter electrode CT.

An alignment film ORI1 is formed on the surface of the substrate SUB1 to cover the pixel electrode PX. The alignment film ORI1 is a film that is brought into contact with the liquid crystal LC, and functions to determine the initial orientation of the molecules of the liquid crystal LC, together with an alignment film ORI2, which is formed on the substrate SUB2 side and is described later.

[Structure of the Vicinity of the Sealing Material]

Figure 9:
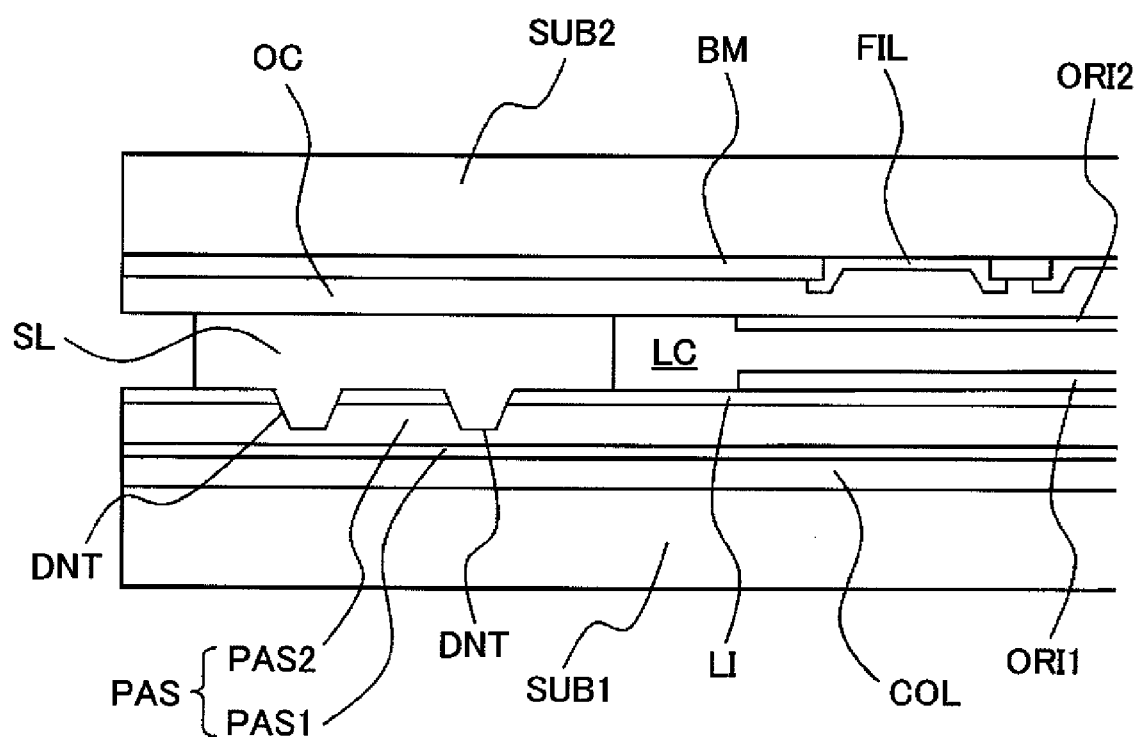
FIG. 9 is a sectional view illustrating a structure of the vicinity of a sealing material of a liquid crystal display device according to a ninth embodiment of the present invention.

FIG. 9 is a diagram illustrating the structure of the vicinity of the sealing material SL in the liquid crystal display device of this embodiment, and presents a sectional view taken along the line I-I of FIG. 10A.

A circuit forming layer COL, the protective film PAS1, the protective film PAS2, the interlayer insulating film LI, and the alignment film ORI1 are layered in the stated order on the liquid crystal side of the substrate SUB1.

In this cases, the image display portion AR of the substrate SUB1 includes multiple pixels arranged in a matrix pattern, and details of a part of the image display portion AR in section are as illustrated in FIG. 12B. FIG. 9, however, illustrates a simplified view of the image display portion AR using the layer structure described above.

A part of the circuit forming layer COL that is in the image display portion AR includes the gate signal line GL, the insulating film GI, the semiconductor layer AS, the drain signal line DL, the drain electrode DT, the source electrode ST, and the pad portion PD that are illustrated in FIG. 12B. The counter electrode CT is placed between the protective film PAS2 and the interlayer insulating film LI, and the pixel electrode PX is placed between the interlayer insulating film LI and the alignment film ORI1.

On the other hand, a part of the circuit forming layer COL that is outside the image display portion AR and extends beyond the region for providing the sealing material SL is provided from a laminate of the insulating film GI and one of the lead-out wiring line WG of the gate signal line GL and the lead-out signal line WD of the drain signal line DL (illustrated in FIG. 9 is a region where the lead-out wiring line WG of the gate signal line GL is formed). The protective film PAS1, the protective film PAS2, and the interlayer insulating film LI that are formed in the stated order above the circuit forming layer COL are extended parts of the protective film PAS1, the protective film PAS2, and the interlayer insulating film LI that are formed in the image display portion AR.

Figure 10B:
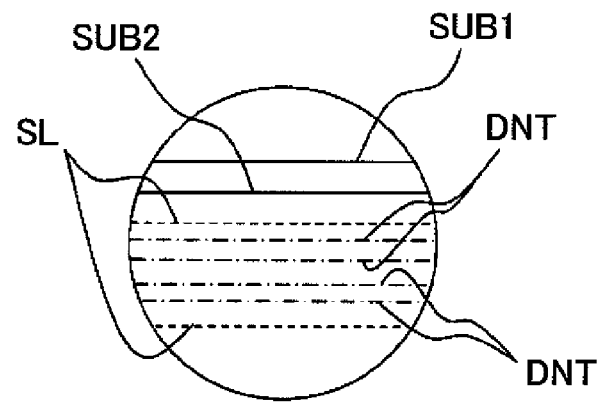
FIG. 10B is an enlarged view of a dotted-line circle 10B of the plan view illustrating the liquid crystal display device according to the ninth embodiment of the present invention.

With this structure, a recessed portion DNT is formed on a surface of the interlayer insulating film (inorganic insulating film) LI in the region for providing the sealing material SL in a manner that exposes the protective film (organic insulating film) PAS2 below the interlayer insulating film LI. In other words, the depth of the recessed portion DNT is set such that the interlayer insulating film LI is passed through but the protective film PAS2 is not passed through. The reason why the recessed portion DNT is given this depth, which is later described in detail, is that the protective film PAS2 which is an organic insulating film is intended to remain (the thickness of the remaining part of the protective film PAS2 is 500 to 1,500 nm) and protect the lead-out wiring line WG (or the lead-out wiring line WD) in the circuit forming layer COL against a mechanical impact (a cushioning function). The recessed portion DNT runs along the longitudinal direction of the sealing material SL and is provided, for example, continuously. The thus shaped recessed portion is arranged such that two recessed portions DNT, for example, are placed in the short (width) direction of the sealing material SL as illustrated in FIG. 10B, which is an enlarged view of a dotted-line circle 10B of FIG. 10A. The number of the recessed portions DNT that are placed in the short direction of the sealing material SL is not limited to two, and may be one or three or more.

The recessed portion DNT which reaches the interlayer insulating film LI and the underlying protective film PAS2 as well is formed in the region where the sealing material SL is provided. The sealing material SL therefore fills the inside of the recessed portion DNT, and hence the sealing material SL is brought into contact with the side walls and bottom of the recessed portion DNT in addition to the surface of the interlayer insulating film LI. The recessed portion DNT thus enables the sealing material SL to bond with the interlayer insulating film LI and the protective film PAS2 in a larger bonding area, and accordingly enhances the substrate SUB1-side adhesion strength of the sealing material SL.

The recessed portion DNT bonds the sealing material SL not only with the interlayer insulating film LI but also with the protective film PAS2. The recessed portion DNT which reaches the protective film PAS2 as well does not pass through the protective film PAS2 and has a bottom that is made up of the protective film PAS2, thereby making the adhesion strength between the sealing material SL and the protective film PAS2 solid. The recessed portion DNT consequently makes the solid adhesion between the interlayer insulating film LI and the protective film PAS2, at least in the region where the recessed portion DNT is formed, and hence peeling between the interlayer insulating film LI and the protective film PAS is prevented.

Figure 13:
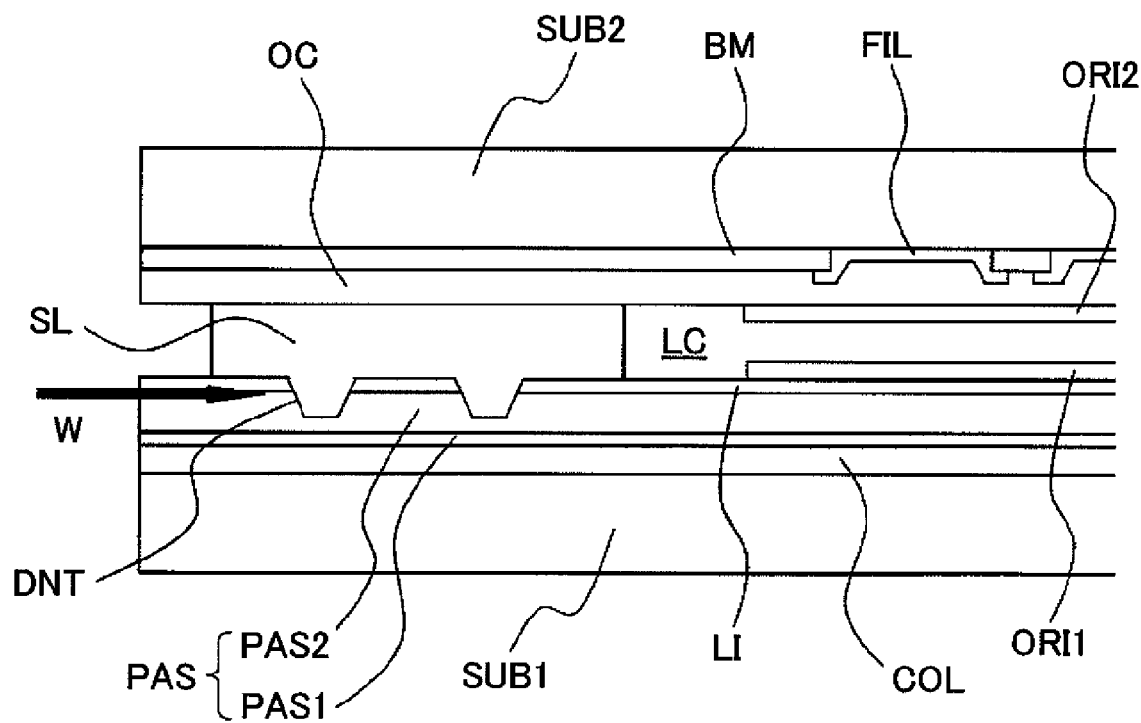
FIG. 13 is a diagram illustrating effects of the liquid crystal display device according to the ninth embodiment of the present invention.

An example of effects of forming each recessed portion DNT continuously along the longitudinal direction of the sealing material SL as in this embodiment is that, if moisture W enters from the interface between the interlayer insulating film LI and the protective film PAS2 as illustrated in FIG. 13, which is drawn in a manner that corresponds to FIG. 9, the sealing material SL filling the recessed portion DNT blocks the moisture infiltration and forestalls an adverse effect to the image display portion AR.

In FIG. 9, a black matrix (light-shielding film) BM is formed on the liquid crystal side of the substrate SUB2. The black matrix BM blocks light between adjacent pixels in the image display portion AR, to thereby improve the contrast. The black matrix BM extends further than the region for providing the sealing material SL in order to avoid light leakage caused by light that is emitted from a backlight (not shown) on the rear side of the liquid crystal display device and transmitted through the sealing material SL and its vicinity. A color filter FIL is formed on a surface of the black matrix BM to cover openings in the black matrix BM in the locations of the pixels. The color filter FIL colors three adjacent pixels red (R), green (G), and blue (B), and the three pixels constitute a unit pixel for color display. The black matrix BM and the color filter FIL are covered with a leveling film OC made of, for example, resin. The alignment film ORI2 is formed in a region of the leveling film OC that corresponds to the image display portion AR.

[Tenth Embodiment]

Figure 14:
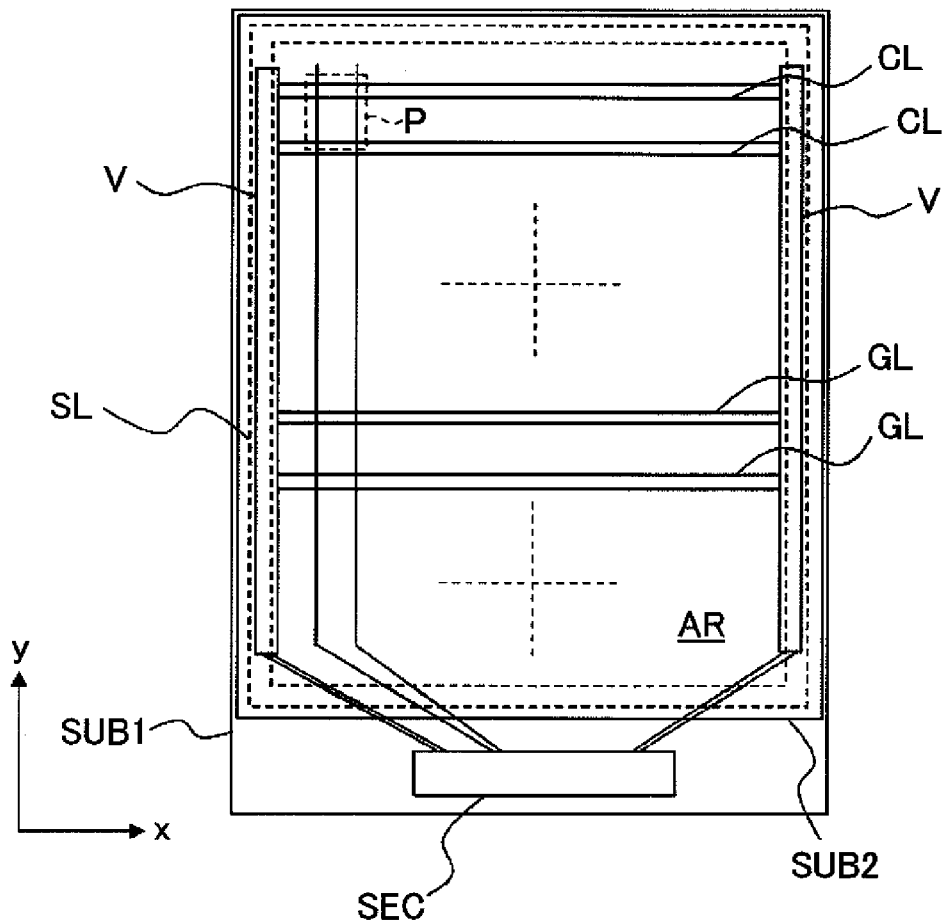
FIG. 14 is a diagram illustrating a structure of a liquid crystal display device according to a tenth embodiment of the present invention.

FIG. 14 is a structural diagram of a liquid crystal display device according to a tenth embodiment of the present invention, and corresponds to FIG. 10A.

FIG. 14 differs from FIG. 10A in that a scanning signal drive circuit V (herein, may simply be referred to as circuit) is formed to the left and right, each, of the image display portion AR in the drawing. The scanning signal drive circuit V is incorporated in the semiconductor device SEC in the ninth embodiment. In the tenth embodiment, the scanning signal drive circuit V is provided as a separate circuit from circuits in the semiconductor device SEC.

The scanning signal drive circuit V is formed on a surface of the substrate SUB1 to contain multiple thin film transistors. The scanning signal drive circuit V is formed in parallel with the formation of the image display portion AR, and accordingly has a layer structure that is substantially the same as that of the image display portion AR.

In order to allow the image display portion AR to take up as large an area as possible, the scanning signal drive circuit V partially overlaps with the region for providing the sealing material SL. Then, forming the recessed portion DNT of FIG. 9 in the interlayer insulating film LI and the protective film PAS2, which cover the scanning signal drive circuit V does not cause a problem, because part of the protective film (organic insulating film) PAS2 remains in the region where the recessed portion DNT is formed and the remaining organic protective film PAS2 provides protection against a mechanical impact.

In FIG. 14, the scanning signal drive circuit V is connected to the gate signal lines GL to supply a scanning signal to each gate signal line GL, and a reference signal is supplied to each common signal line CL via the scanning signal drive circuit V. The rest of the liquid crystal display device according to the tenth embodiment is substantially the same as in the ninth embodiment, and descriptions on the similar points are omitted.

[Eleventh Embodiment]

Figure 15:
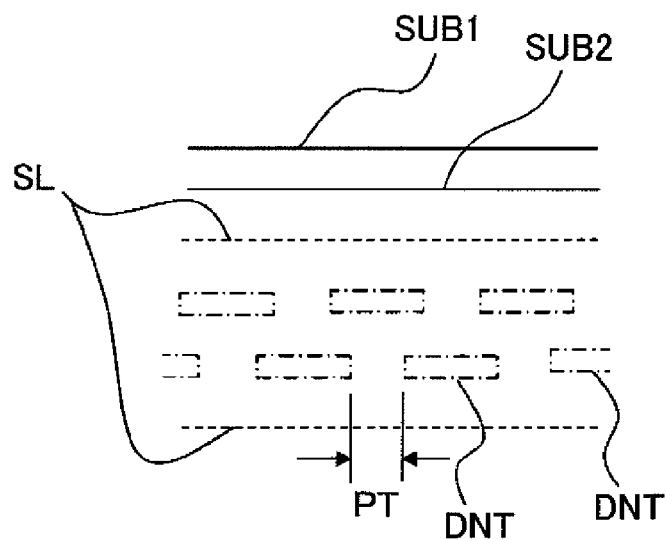
FIG. 15 is a diagram illustrating a structure of a liquid crystal display device according to an eleventh embodiment of the present invention.

FIG. 15 is a structural diagram of a liquid crystal display device according to an eleventh embodiment of the present invention, and corresponds to FIG. 10B, which is the enlarged view of a dotted-line circle 10B of FIG. 10A.

A difference of FIG. 15 from FIG. 10B resides in the recessed portion DNT, which is formed in the interlayer insulating film LI and the underlying protective film PAS2. The recessed portion DNT of this embodiment is formed discontinuously along the longitudinal direction of the sealing material SL. In FIG. 15, two (note that it is not limited to two) recessed portions DNT are placed side by side in the short direction of the sealing material SL and each of the recessed portions DNT is discontinuous along the longitudinal direction of the sealing material SL.

With the recessed portion DNT structured as this, the adhesion between the interlayer insulating film LI and the protective film PAS2 is solid in the region for forming the recessed portion DNT, and peeling is prevented between the interlayer insulating film LI and the protective film PAS2. Therefore, this structure can be employed instead of forming the recessed portion DNT continuously as in the ninth embodiment.

Further, in this case, as illustrated in FIG. 15, while the intermittent pattern of one of the two recessed portions DNT placed side by side in the short direction of the sealing material SL creates a region (denoted by PT in the drawing) where no recessed portion DNT is formed in the longitudinal direction of the sealing material SL, a region in the short direction of the sealing material SL that is beside the region PT has the other of the two recessed portions DNT. The rest of the liquid crystal display device according to the eleventh embodiment is substantially the same as in the ninth embodiment, and descriptions on the similar points are omitted.

With the structure described above, despite each recessed portion DNT being formed discontinuously in the longitudinal direction of the sealing material SL, each recessed portion DNT has the same effect as when the recessed portion DNT is formed continuously, as far as the effect is measured along the longitudinal direction of the sealing material SL, owing to other multiple recessed portions DNT parallel to the recessed portion DNT in question. Therefore, if moisture enters from the interface between the interlayer insulating film LI and the protective film PAS2, the multiple recessed portions DNT placed side by side in the short direction of the sealing material SL block the moisture infiltration and forestall an adverse effect to the image display portion AR.

This effect can be provided also by three or more recessed portions that are placed side by side in the short direction of the sealing material SL and when the recessed portions are each formed discontinuously in the respective columns. In either case, it is sufficient if at least one of the recessed portions is formed in the width direction of the sealing material SL at any point along the circumferential direction of the sealing material SL.

[Twelfth Embodiment]

Figure 16:
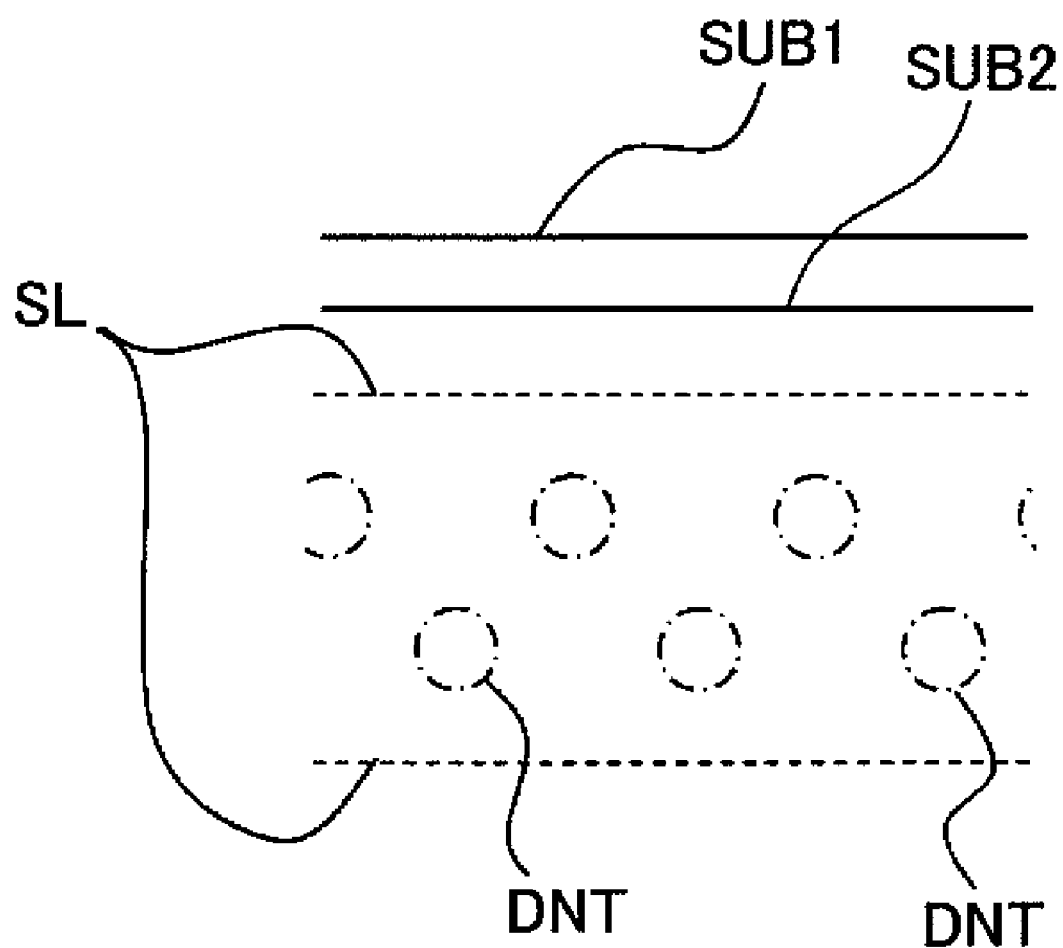
FIG. 16 is a diagram illustrating a structure of a liquid crystal display device according to a twelfth embodiment of the present invention.

FIG. 16 is a structural diagram of a liquid crystal display device according to a twelfth embodiment of the present invention, and corresponds to FIG. 15.

FIG. 16 differs from FIG. 15 in that each recessed portion DNT has a dot pattern, with dots of the recessed portions DNT scattered in the region where the sealing material SL is provided. Overall, the multiple dots of the recessed portions DNT are formed along the circumferential direction of the region for providing the sealing material SL. The rest of the liquid crystal display device according to the twelfth embodiment is substantially the same as in the ninth embodiment, and descriptions on the similar points are omitted.

With this structure, the recessed portion DNT of this embodiment, too, has an effect of connecting the interlayer insulating film LI and the protective film PAS2 solidly in the region where the recessed portion DNT is formed, and preventing peeling between the interlayer insulating film LI and the protective film PAS2.

In FIG. 15, the dots of each dot-patterned recessed portion DNT are relatively small in area. Alternatively, the dots may be made larger in area to put at least one dot of the recessed portions DNT in the width direction of the sealing material SL at any point along the circumferential direction of the sealing material SL. With this, the recessed portions block moisture entering from the interface between the interlayer insulating film LI and the protective film PAS2.

The dots of the dot-patterned recessed portions DNT may have a triangular shape, a rectangular shape, or other shapes instead of a round shape.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
   a first substrate and a second substrate which are arranged so as to be opposed to each other and sandwich a liquid crystal;
   an image display portion which is formed by an aggregation of multiple pixels in a direction in which the liquid crystal spreads; and
   a sealing material which is provided between the first substrate and the second substrate to surround the image display portion, and which seals the liquid crystal,
   wherein one of wiring and a circuit and an insulating film, which covers one of the wiring and the circuit, are formed at least in a region of the first substrate where the sealing material is provided,
   wherein the insulating film includes at least an inorganic insulating film placed on a front side, which is closer to the sealing material, and an organic insulating film placed below the inorganic insulating film brought into contact with the inorganic insulating film, and
   wherein recessed portions are formed in a sealing material formation region along a circumferential direction of the sealing material formation region, to a depth that makes the recessed portions pass through the inorganic insulating film but not the organic insulating film,
   wherein the inorganic film is formed between the recessed portions.

2. The liquid crystal display device according to claim 1, wherein the recessed portions are formed continuously along the circumferential direction of the sealing material.

3. The liquid crystal display device according to claim 2, wherein the recessed portions are formed such that multiple recessed portions are placed side by side in a width direction of the sealing material.

4. The liquid crystal display device according to claim 1, wherein a plurality of the recessed portions are formed discontinuously along the circumferential direction of the sealing material.

5. The liquid crystal display device according to claim 4, wherein the recessed portions are formed such that multiple recessed portions are placed side by side in a width direction of the sealing material.

6. The liquid crystal display device according to claim 1, wherein at least one of a plurality of the recessed portions are formed in the width direction of the sealing material at any point in the circumferential direction of the sealing material.

7. The liquid crystal display device according to claim 1, wherein the recessed portions are formed such that dots of dot-patterned recessed portions are scattered on the sealing material formation region.

8. The liquid crystal display device according to claim 1, wherein the recessed portion which does not pass through the organic insulating film is a partially etched portion of the organic insulating film.

9. The liquid crystal display device according to claim 8, wherein the organic insulating film is thicker than the inorganic insulating film.

10. The liquid crystal display device according to claim 9, wherein the insulating film further comprises another inorganic insulating film formed below the organic insulating film so that said organic insulating film is sandwiched between said inorganic insulating film and said another inorganic insulating film.

11. The liquid crystal display device according to claim 10, wherein the organic insulating film is thicker than said another inorganic insulating film.

12. The liquid crystal display device according to claim 1, wherein the insulating film further comprises another inorganic insulating film formed below the organic insulating film so that said organic insulating film is sandwiched between said inorganic insulating film and said another inorganic insulating film.

13. The liquid crystal display device according to claim 12, wherein the organic insulating film is thicker than said another inorganic insulating film.

* * * * *